United States Patent
Klein et al.

(10) Patent No.: US 7,283,814 B2
(45) Date of Patent: Oct. 16, 2007

(54) METHOD AND APPARATUS FOR SCHEDULING TRANSMISSIONS IN WIRELESS DATA NETWORKS

(75) Inventors: Thierry E Klein, Westfield, NJ (US); Kin K Leung, Edison, NJ (US); Haitao Zheng, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 839 days.

(21) Appl. No.: 10/631,990

(22) Filed: Jul. 31, 2003

(65) Prior Publication Data

US 2005/0025090 A1 Feb. 3, 2005

(51) Int. Cl.
*H04M 3/00* (2006.01)
(52) U.S. Cl. ............... 455/419; 455/418; 455/408; 455/422.1; 370/328; 370/329; 370/338
(58) Field of Classification Search ........... 455/444, 455/443, 442, 441, 440, 436, 419, 418, 408, 455/422.1; 370/328–338
See application file for complete search history.

(56) References Cited

U.S. PATENT DOCUMENTS

2003/0084175 A1* 5/2003 Kaniyar et al. ............ 709/230

OTHER PUBLICATIONS

A Jalali, R. Pankaj (IEEE, 2000 (data throughput of CDMA-HDR a High Efficiency-High Data Rate Personal Communication Wireless System)).*
Yeung, K. L., Nanda, S. "Channel Management in Microcell/Macrocell Cellular Radio Systems", *IEEE Transactions On Vehicular Technology*, vol. 45, No. 4, pp. 601-612 (Nov. 1996).
Jabbari, B., Fuhrmann, W. F., "Teletraffic Modeling and Analysis of Flexible Hierarchical Cellular Networks with Speed-Sensitive Handoff Strategy", *IEEE Journal On Selected Areas In Communications*, vol. 15, No. 8, pp. 1539-1548 (Oct. 1997).
Sung, C. W., Wong, W. S., "User Speed Estimation and Dynamic Channel Allocation in Hierarchical Cellular System", *IEEE*, pp. 91-95 (1994).
Beraldi, R., Marano, S., Mastroianni, C. "A Reversible Hierarchical Scheme for Microcellular Systems with Overlaying Macrocells", *IEEE*, pp. 51-58 (1996).
Benveniste, M., "Cell Selection in Two-Tier Microcellular/Macrocellular Systems", *IEEE*, pp. 1532-1536 (1995).
Rappaport, S. S., Hu, L.-R., "Microcellular Communication Systems with Hierarchial Macrocell Overlays: Traffic Performance Models and Analysis", *Proceedings of the IEEE*, vol. 82, No. 9, pp. 1383-1397 (Sep. 1994).
Bender, P., Black, P., Grob, M., Padovani, R., Sindhushayana, S. Viterbi, A., "CDMA/HDR: A Bandwidth-Efficient High-Speed Wireless Data Service for Nomadic Users", *IEEE Communications Magazine*, pp. 70-77 (2000).
Austin, M.D., Stuber, G.L., "Velocity Adaptive Handoff Algorithms for Microcellular Systems", *IEEE Transactions on Vehicular Technology*, vol. 43, No. 3, pp. 549-561 (Aug. 1994).

(Continued)

*Primary Examiner*—Rafael Perez-Gutierrez
*Assistant Examiner*—Khai Nguyen (57) ABSTRACT

A method and apparatus for scheduling data transmissions is disclosed that reduces the delay variability in transmissions of data. A scheduling metric is calculated as a function of a TCP throughput rate for each mobile terminal in the system. The relative value of this metric for a user is used to schedule data transmissions from that user. As a result, TCP time-outs are reduced or avoided and the throughput and the predictability of system performance are increased.

32 Claims, 5 Drawing Sheets

OTHER PUBLICATIONS

Holtzman, J.M., "Asymptotic Analysis of Proportional Fair Algorithm", *IEEE*, pp. F-33-F-37 (2001).

Jalali, A., Padovani, R., Pankaj, R., "Data Throughput of CDMA-HDR a High Efficiency-High Data Rate Personal Communication Wireless System", *IEEE*, pp. 1854-1858 (2000).

Viswannath, P., Tse, D.N.C., Larola, R., "Opportunistic Beamforming Using Dumb Antennas", *IEEE Transactions on Information Theory*, vol. 48, No. 6, pp. 1277-1294 (2002).

* cited by examiner

METHOD AND APPARATUS FOR SCHEDULING TRANSMISSIONS IN WIRELESS DATA NETWORKS

FIELD OF THE INVENTION

The present invention relates to wireless data transmission systems and, more specifically, to the improvement of scheduler performance in such systems.

BACKGROUND OF THE INVENTION

Wireless communications systems are becoming an increasingly integral, aspect of modern communications. In order to ensure quality of service and end-user satisfaction, efficient resource allocation and management strategies are required. In multi-user wireless data systems, scheduling algorithms are used to give priority to users and to schedule transmissions to and from those users. For such systems where user channel conditions change over time, such scheduling algorithms take advantage of channel variations by giving priority to the users with better channel conditions over a given time frame, while at the same time ensuring fairness among the user population.

While traditional wireless networks have primarily carried voice traffic, current and next-generation wireless networks are becoming increasingly data-centric due to the increased popularity of data applications using protocols such as the Transmission Control Protocol (TCP). As such, future wireless networks must increasingly be able to efficiently allocate resources between both voice and data traffic. However, such efficiency can be difficult to achieve because data applications are fundamentally different from traditional voice applications, both in terms of the traffic characteristics and the quality of service requirements. This difference stems from the fact that, in general, voice applications typically require a constant transmission rate, independent of the network loading and the wireless channel quality. Reliable communication in such voice applications is generally achieved through power control to alleviate adverse channel conditions. On the other hand, in data applications, performance as perceived by the end-user is closely related to the network-layer throughput, the transaction time for initiating a connection and the transaction time for transmitting the data. Both the throughput and transaction time for data transmissions are dependent upon the channel quality, the network load and the resource allocation (scheduling) strategy.

Data applications are typically more delay-tolerant than voice applications and are able to accept a marginal increase in delay to achieve improved long-term throughput and greater energy efficiency. For example, email communications are much less sensitive to delays and interruptions in transmission than are voice communications. Internet access and file transfers, likewise, can tolerate a bursty communications channel, as long as reasonable response times and, reasonable average throughputs are maintained. Further, due to increased buffering typically available on data devices relative to voice devices, and due to the substantially unidirectional nature of the communications, even streaming data applications exhibit a greater robustness to data interruptions than do voice communications. This relative delay tolerance of data traffic, in addition to the bursty nature of data traffic (i.e., packets of data in a transmission tend to be transmitted in bursts), allows for flexible transmission scheduling strategies in order to achieve greater efficiency of the limited network resources.

To meet the specific demands of wireless data systems, several well-known scheduling strategies have been used to maximize the packet data throughput subject to various conditions. One such strategy is to schedule data transmissions based on the relative channel quality of the different users. At its simplest, such a strategy would schedule the user with the best instantaneous channel quality, thereby maximizing overall system throughput. However, such a strategy would have the effect of preventing weaker users from being scheduled for transmission and would, therefore, lead to potential unfairness across the user population.

It has been widely recognized that it is important to allocate resources to achieve an acceptable balance between system performance and fairness among users. A well-known algorithm that achieves this objective is the Proportional Fair algorithm that is, for example, used in CDMA 1×EV-DO systems. Instead of simply scheduling the user with the best instantaneous channel quality, this algorithm schedules users in a fair manner to ensure that even users with relatively weak channel conditions receive adequate data throughputs, proportionally to the relative strengths of their channel quality. The Proportional Fair algorithm achieves fairness, in general, by scheduling users for transmission close to the relative peaks of their channel quality. As a result, system throughput is increased because of the fact that, the more users there are in the system, the more probable it is that at least one of the users' channel condition is close to its peak value.

SUMMARY OF THE INVENTION

The present inventors have recognized that, while the performance of prior proportional fair algorithms in a wireless network utilizing TCP is advantageous in many regards, such algorithms have certain disadvantages. Specifically, proportional fair algorithms, as previously known, have not been designed to consider fairness or efficiency at other layers in the network, such as the TCP layer, which very often defines user-perceived performance. The primary goal of TCP is to ensure efficient utilization of the available bandwidth in the network and to prevent overloading of the network (which could result in lost data packets). TCP networks accomplish these goals by throttling the users' transmissions by decreasing the users' transmission rates when packet losses are detected. This is generally acceptable in wire-line TCP networks as packet losses are generally indicative of network congestion and, hence, such throttling is appropriate. However, in wireless networks, packet loss or suspected packet loss (e.g., a packet is not acknowledged after a certain amount of time) is not always the result of such congestion. For example, when a packet is transmitted to, for example, a scheduler in a base station, the packet may experience a delay in queue while awaiting transmission over the air to the end-user as determined by a scheduling algorithm, such as the Proportional Fair algorithm. The delay between successive scheduling times for a particular mobile terminal (the inter-scheduling delay) will vary according to the criteria used by that algorithm. Variability in this delay is exacerbated by the inherent delay variability in wireless networks that rely on retransmission techniques, such as the hybrid automatic repeat request (HARQ) technique (e.g., which interleaves packets to be retransmitted into the data stream, thus potentially increasing the delay of a transmission further). The resulting cumulative delay variability can cause TCP time-outs due to suspected packet loss that results in an interruption of the data transmission.

Therefore, the present inventors have invented a method and apparatus for scheduling data transmissions that is proportionally fair at the TCP layer of the network and that reduces the delay variability in transmissions of data. This method and apparatus calculate a metric that is a function of a TCP throughput for each mobile terminal in the system. The relative value of this metric for a user is used to schedule data transmissions from that user. As a result, TCP time-outs are reduced or avoided and the throughput and the predictability of system performance are increased.

DETAILED DESCRIPTION OF THE INVENTION

Figure 1:
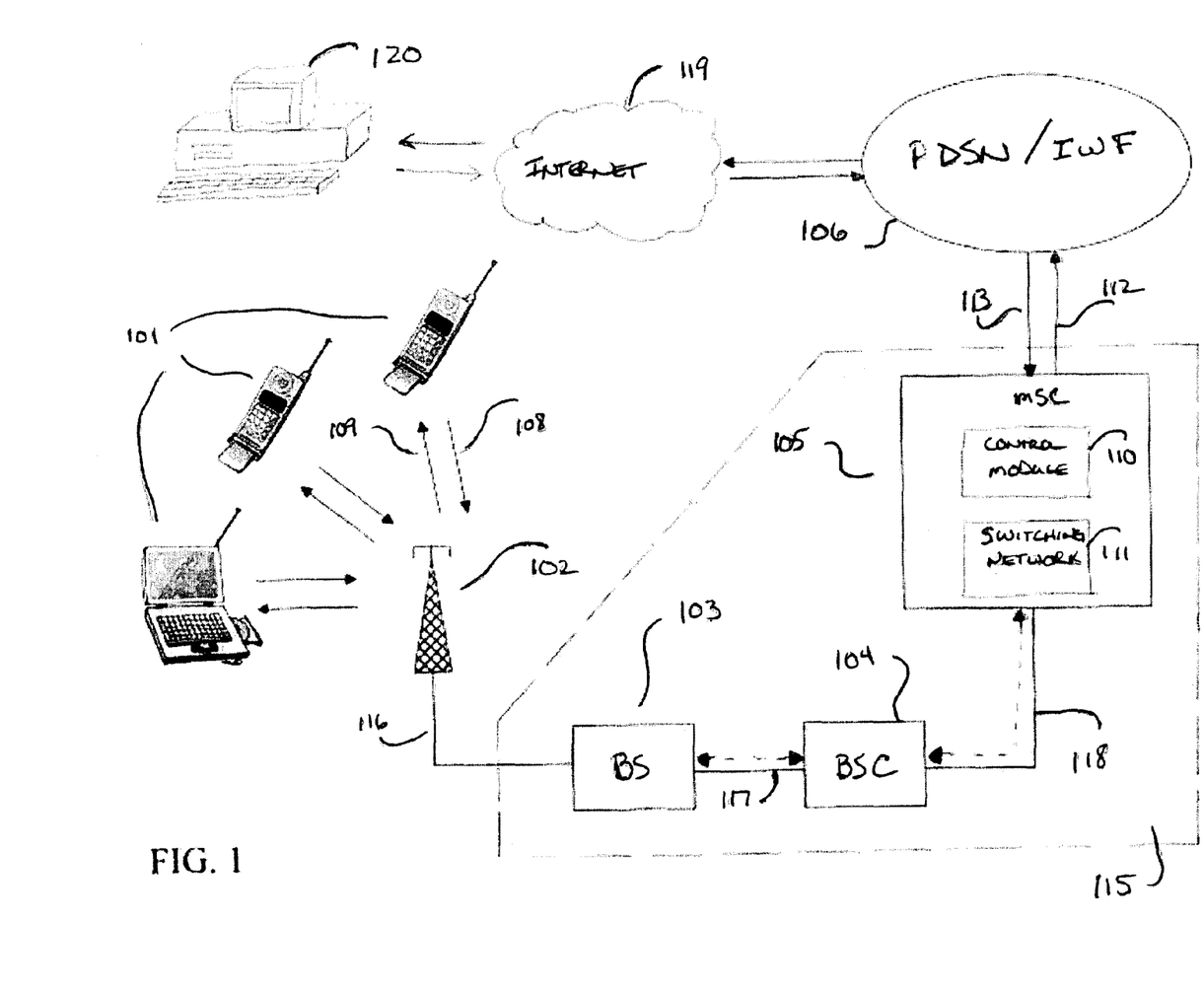
FIG. 1 shows a prior art illustration of a wireless communications system.

FIG. 1 shows an embodiment of a wireless communication system, in which the present invention may be implemented in which, illustratively, data messages are transmitted to and from mobile terminals 101. Mobile terminals 101 communicate with other communication nodes (e.g., other mobile terminals or traditional telephones) by transmitting signals to antenna 102. Antenna 102 is used to both transmit data from network 115 to the mobile terminals 101 along air interface 109, as well as to receive data from mobile terminals 101 along air interface 108 and transmit it to network 115. Antenna 102 is connected to illustrative base station 103 via connection 116 and base station 103 is connected to an illustrative base station controller (BSC) 104 via connection 117. One skilled in the art will recognize that wireless systems may or may not use BSCs, such as illustrative BSC 104. BSC 104 is connected to mobile switching center (MSC) 105 via connection 118. MSC 105, which typically controls multiple base station or base station controllers, comprises, among other components, control module 110 and switching network 111 which, together, function to issue control signals to other parts of the network and to switch incoming and outgoing voice and data messages such that they reach the correct destination. MSC 105 is connected via communication paths 112 and 113 to a packet data serving node (PDSN)/Interworking Function (IWF) 106 in order to facilitate data communications over, for example, the internet 119 between wireless terminals 101 and other communication nodes, for example computer 120.

When one of the mobile terminals 101 attempts to establish a call connection to another communication node, MSC 105 receives a data message, via base station 103 and BSC 104, indicating that such an attempt is being made. Upon receiving the data, message, MSC 105 checks the mobile terminal's identification, checks the called number and selects an outgoing trunk to the PDSN/IWF 106. The MSC 105 also selects a radio channel for the mobile terminal and sends a data message to the cell site to instruct the mobile to tune to the selected radio channel. In the case of calls to, rather than from, the mobile terminal, the MSC 105 sends a data message to the cell sites served by it to broadcast a paging message to the mobile terminals. MSC 105 also coordinates handoffs from one cell site to another and controls signaling functions associated with call disconnect.

As discussed above, scheduling algorithms are used to schedule transmissions from senders, such as computer 120 in FIG. 1 to mobile users in the network of FIG.1 over the air interface 109. Such algorithms assign time slots for the transmission of data to each mobile user from, for example, a queue at the base station where data is temporarily stored. Referring once again to FIG. 1, this scheduling function is typically implemented within network 115 by circuitry within, illustratively, a computer processor executing code within the BS 103 or the BSC 104. One skilled in the art will realize that such scheduling may be implemented in any component within network 115. Additionally, one skilled in the art will also realize that the different calculations necessary in such scheduling algorithms may take place in one circuit or in separate calculations performed by individual circuits.

One illustrative scheduling algorithm, discussed above and well-known in the art, is the Proportional Fair algorithm. This algorithm schedules users in a way such that a user's transmission occurs close to the relative peaks of its user-specific channel quality. As a result, system throughput is increased because of the fact that, the more users there are in the system, the more probable it is that at least one of the users' channel conditions is close to its peak value. The scheduling metric $M_i^{(MAC-PF)}[n]$ used to schedule a user i according to the Proportional Fair algorithm may be expressed as:

$$M_i^{(MAC-PF)}[n] = \frac{R_i[n]}{A_i[n-1]} \quad (1)$$

where n is the timeslot in which a user transmission is to be scheduled, $R_i[n]$ is the maximum feasible transmission rate for user i in timeslot n measured, for example, in bits/second, and $A_i[n-1]$ is the estimated smoothed average throughput (once again, illustratively in bits per second) of user i calculated based on transmissions received up to and including timeslot n−1. The average throughput $A_i[n]$ for user i is calculated, for example, by:

$$A_i[n]=\omega\delta_i[n]R_i[n]+(1-\omega)A_i[n-1] \quad (2)$$

where ω is a tunable parameter to adjust the weight accorded to the different terms of equation 2 and, illustratively, $$\omega = \frac{1}{1000}.$$

The function $\delta_i[n]=1$ if user i is scheduled for transmission in slot n and $\delta_i[n]=0$ if user i is not scheduled for transmission in slot n. The Proportional Fair scheduling algorithm then chooses the user i with the largest scheduling metric in timeslot n for transmission in that timeslot. The selected user's transmission rate is taken as the maximum feasible transmission rate for the selected user in that timeslot.

Thus, a proportional fair algorithm, utilizing scheduling metrics such as that expressed in equation 1, schedules users based on the ratio of the current feasible transmission rate to the current estimated throughput based in part on past transmission rates. Accordingly, this metric favors transmission to the user, such as one of the users 101 in FIG. 1, whose current transmission rate/channel condition is relatively large compared to its own past transmission rates/channel conditions. It also favors users that have not been scheduled for some time and consequently whose average throughput has decreased substantially relative to that of other users. Thus, in this implementation of a proportional fair algorithm, each user 101 will eventually receive a time slot for transmission, when that user's channel condition is close to its best or when that user has not been scheduled and received data transmission for a long time. However, while each user will receive a slot for transmission, the delay between successive transmissions from a particular user may vary greatly depending, among other factors, on the variability in that user's channel condition. Such variability in transmission delays is referred to hereinafter as inter-scheduling delay variability.

While proportional fair algorithms, such as that described above, are desirable in many regards and solve significant problems in the scheduling of wireless transmissions, the present inventors have recognized that significant problems arise when a proportional fair scheduling algorithm is used in a network that is also using the Transmission Control Protocol (TCP) to transmit data. These problems arise, in part, due to the interdependencies of the wireless scheduling algorithm and the packet-loss detection and compensation mechanisms that are used as part of the TCP protocol.

Figure 2:
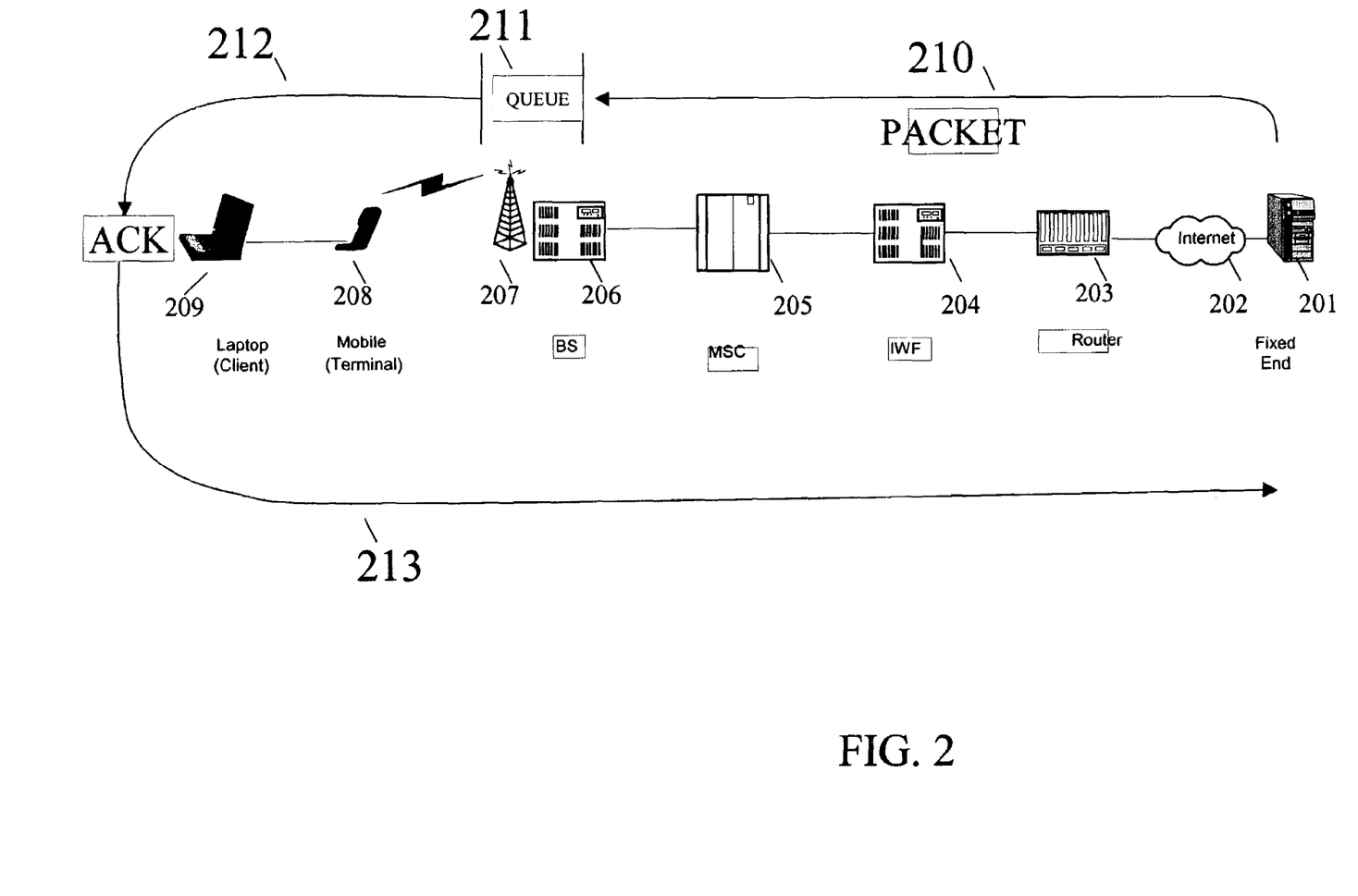
FIG. 2 shows the prior art travel of a Transmission Control Protocol (TCP) data packet in an illustrative wireless communications system.

The TCP protocol is a higher layer protocol that is used to transmit data packets from a sender and receive acknowledgments of receipt of those data packets from a destination. Referring to FIG. 1, the TCP protocol ensures that packets are delivered from, for example, computer 120 to one of the users 101. In order to verify this delivery, an acknowledgment of the receipt of each packet is sent back to computer 120 from the destination user 101. FIG. 2 shows a depiction of the data flow between a sender and a user where TCP is used for delivery of data packets and for verification of their receipt. In that figure, sender 201 which is, illustratively, a computer server connected to internet 202, sends a data packet along path 210 to base station 206 with associated antenna 207. In a wireless data network, for example, path 210 may be a path over or through router 203, IWF 204 and MSC 205. When the data packet reaches base station 206, it enters a queue designed to temporarily hold incoming data until the scheduler, located exemplarily at base station 206, schedules transmission of the data to mobile terminal 208. Once transmission is scheduled, the data is transmitted over the air along path 212 to mobile terminal 208 and end user 209 (here, illustratively, a laptop computer). Upon successful receipt of the packet, end user 209 responds by sending an acknowledgment (ACK) notice to the sender 201 along path 213.

While the most reliable method of transmission between sender 201 and end user 209 would require the reception of an ACK packet for each data packet before sending a new data packet, this would significantly limit data throughput. Therefore, as long as data is being successfully received (i.e., there are no lost packets), TCP gradually increases the number of packets allowed to be sent in a transmission "window" (the number of packets that the sender is permitted to send) before receiving an ACK from the end user. For example, initially, TCP may only allow one packet to be sent in a window. When an ACK for that packet is received, TCP may double the window size to two packets. Then, for each consecutively received ACK, TCP may further double the number of packets allowed to be sent in a transmission window, up to the throughput limit for that sender. The TCP protocol follows other procedures when a packet is determined to be lost. For example, a packet is determined to be lost when an acknowledgment of the receipt of a packet is not received from the destination user 209 in FIG. 2 by a specific time threshold. This time threshold is generally based on the maximum predicted round trip time (RTT) from the time a packet is sent by sender 201 to the time an ACK for that packet is received by the sender 201. This RTT threshold is adjustable to allow for different system conditions and to permit limited variability in the time taken to receive an acknowledgment. Once adjusted, any packet for which an acknowledgment is not received by that time threshold (taking into account any allowed variability) is determined to be lost.

When a determination is made that one or more packets are lost, TCP compensates for this loss in two ways: first, the protocol will request retransmission of the lost packet(s) from sender 201 and, second, the protocol will institute congestion control. TCP congestion control is used because, in traditional wire-line networks, most packet losses are a direct result of network congestion or overloads. Thus, typically, TCP congestion control consists of limiting, or throttling, the transmissions from sender 201 to limit the data traffic in the system and to reduce the congestion in the network. This throttling is accomplished by reducing the number of packets sender 201 can send in a given transmission window and, as a result, lowering the total data throughput in the system. One skilled in the art will recognize that the operations of the well-known TCP protocol are typically much more detailed than as set forth in the above description and that such details may vary depending on the particular version of TCP used.

Figure 3:
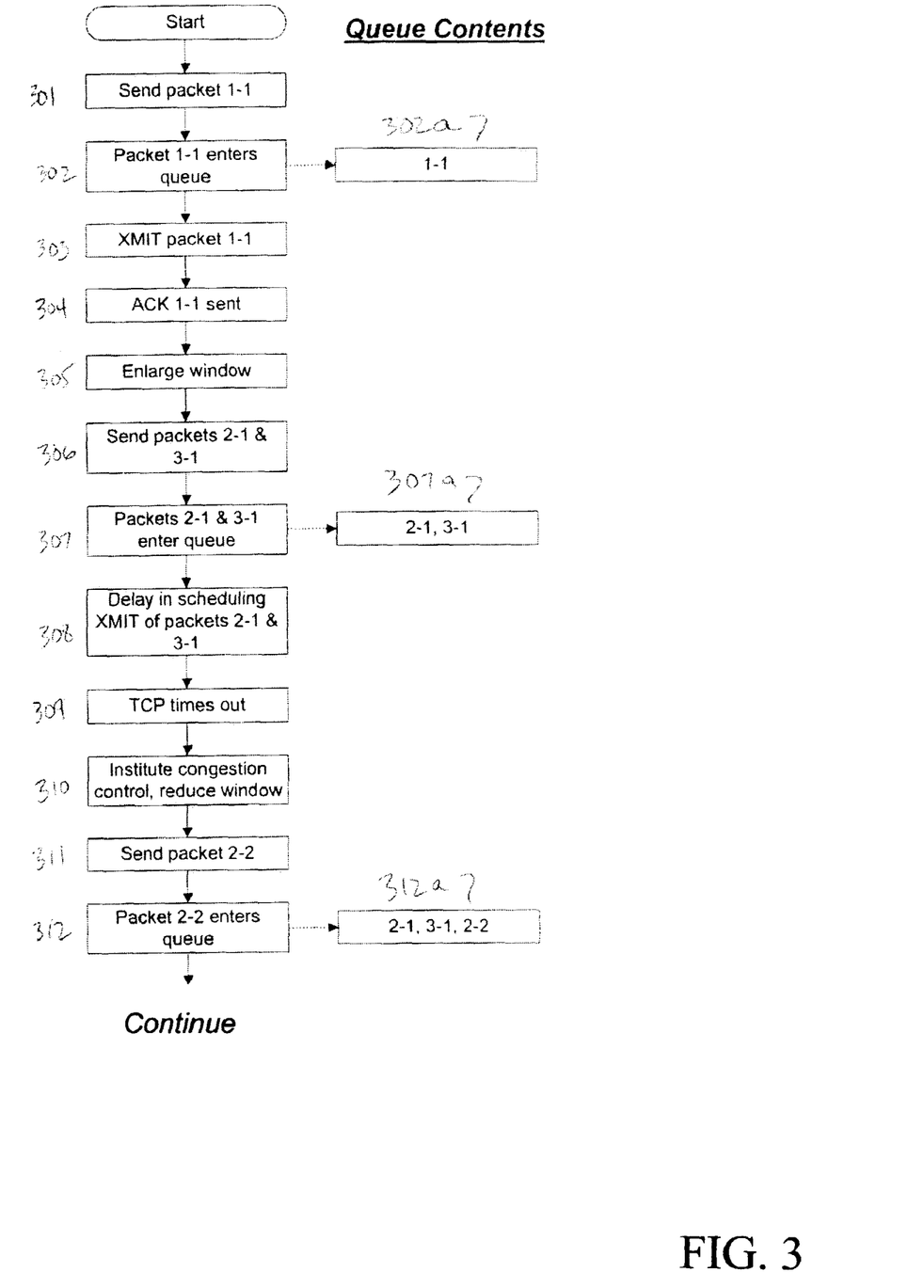
FIG. 3 shows an illustrative flow of packets into and out of the base station queue within the wireless communications system of FIG. 2.

Thus, TCP assumes that detected packet losses are indicative of network congestion. In a wireless data network with a proportional fair scheduler, however, the packet losses detected by TCP may in fact not be the result of such congestion. In fact, detected losses may not even be actual packet losses. Instead, such detected losses may be due to excessive delays in delivering a particular packet. One primary contributing factor in these delays is the aforementioned inter-scheduling delay variability resulting from the use of a proportional fair scheduling algorithm. The above description of TCP operations is merely illustrative. As discussed previously, the Proportional Fair algorithm schedules transmissions to users based on, among other factors, that user's channel condition. Since channel conditions may vary significantly (e.g., due to a user's movement or atmospheric effects), the inter-scheduling delay between successive transmissions to a user may also potentially vary significantly. Thus, a packet or a portion of a packet may wait in queue for transmission to a user for a relatively significant amount of time. Accordingly, the total RTT taken for a packet to reach a user from a sender and the user to send an acknowledgment back to the sender will directly vary, in part, based upon this inter-scheduling delay. If this RTT exceeds the TCP RTT threshold for receipt of an acknowledgment, TCP will time out and will institute the above-discussed retransmission and congestion control procedures. FIG. 3 shows an illustrative flow of how the interaction between the scheduling algorithm and the TCP protocol may result in the detection of lost packets even though no packets have, in fact, been lost. In that figure, at step 301, sender 201 in FIG. 2 sends packet 1-1. The notation 1-1 indicates that it is the initial transmission of the first packet. For illustrative purposes only, a notation 1-2 would indicate the second transmission (retransmission) of packet 1. At step 302, packet 1-1 enters the queue at, for example, base station 206 in FIG. 2. Thus, as shown in box 302a, the packet 1-1 is the only packet in queue at this point. Next, at step 303, packet 1-1 is scheduled and transmitted by the base station 206 in FIG. 2 to mobile terminal 208 in that figure. Once received by end user 209, that user responds with an ACK requesting transmission of packet 2. At step 305, since the ACK for packet 1-1 is received by the sender thereby indicating that the transmission of packet 1 was successful, the TCP protocol enlarges the transmission window for sender 201 to, illustratively, two packets. As such, sender 201 sends packets 2-1 and 3-1. At step 307, these packets enter the queue at base station 206. Since packet 1-1 was already transmitted to the mobile terminal, packets 2-1 and 3-1 are the only contents of the queue at this point, as noted by block 307a.

Next, at step 308, a delay is encountered, caused by inter-scheduling delays as discussed previously, that delays the receipt of packet 2-1 which, in turn, delays the sending of an ACK back to the sender. In this case, illustratively, the inter-scheduling delay is of sufficient length that the TCP round-trip time threshold is exceeded and, accordingly, at step 309, TCP times out. As a result of this time-out condition, at step 310 TCP determines that packets 2 and 3 were lost due to network congestion and, therefore, institutes congestion control by reducing the transmission window for sender 201 in FIG. 2. At step 311, sender 201 retransmits packet 2 in response to a request from TCP. This packet is denoted packet 2-2, as it is the second time packet 2 has been transmitted. At step 312, packet 2-2 enters the queue at the base station 206 and, thus, at this point, as shown in box 312a, the queue now contains packets 2-1 (the first transmission of packet 2), packet 3-1 and erroneously redundant packet 2-2. Such redundancies may lead to further congestion control and, accordingly, decreased system throughput.

Figure 4:
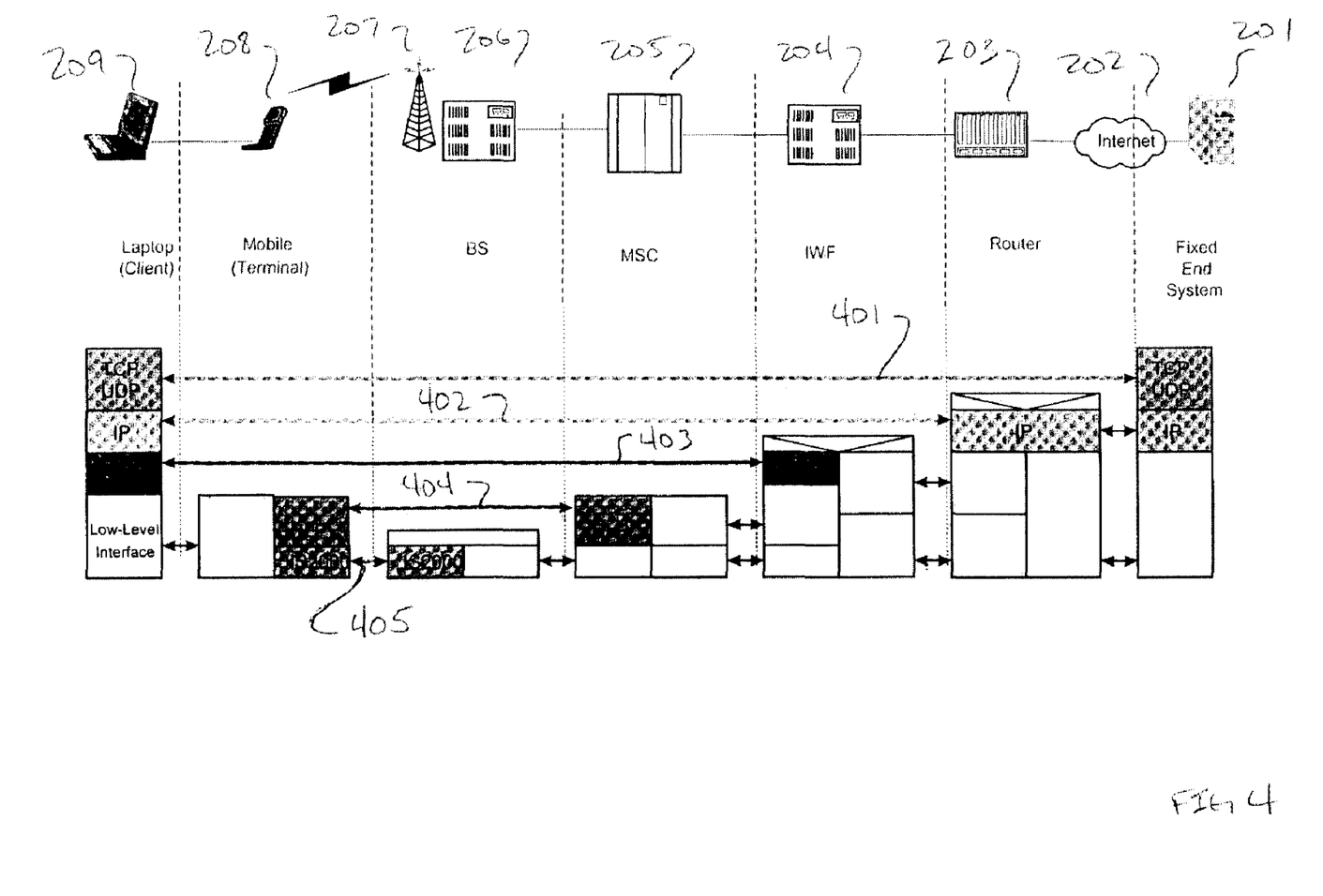
FIG. 4 shows typical protocols used in the wireless communication system of FIG. 2.

As will be apparent to one skilled in the art, TCP timeouts might be preventable if information about which packets are in queue is made available to TCP. However, the queue and the scheduler at the base station are not at the same layer in the network as TCP. FIG. 4 shows the illustrative network of FIG. 2 and the various illustrative protocols 401-405 that are used between the components 201-209 of the network. In that figure, as discussed above, TCP protocol is used to transmit data from the sender 201 to the mobile terminal 208 and the end user 209. This protocol is represented by line 401. However, other well-known protocols are used at different layers of the network to facilitate the transfer of data between other components in the network. For example, router 203 uses the well-known Internet Protocol (IP), represented by line 402, for transmissions to and from the end user. Similarly, the Interworking Function (IWF) illustratively uses a Point to Point Protocol (PPP), represented by line 403, for transmission to and from the end user. Within the wireless network itself, the MSC and mobile terminal communicate control signals and data using the Radio Link Protocol (RLP), represented by line 404. Finally, the base station 206 and the mobile terminal 208 communicate data across what is known as the Medium Access Control (MAC) layer using, for example, the well-known IS2000 (UMTS) protocol, represented by line 405. This MAC layer is the layer at which both the base station queue and the scheduler reside. Thus, as will be apparent to one skilled in the art, data transfer between the MAC layer and the TCP layer is not readily available.

The present inventors have recognized that the above throughput problems that occur in a wireless data network using the TCP protocol occur because the Proportional Fair algorithm is optimized for ensuring fairness and efficiency at the MAC layer only. Proportional fair algorithms, as previously known, have not been designed to consider fairness or efficiency at other layers in the network, such as the TCP layer, which very often defines user-perceived performance. Therefore, the present inventors have discovered that it is desirable to use a scheduling algorithm that is based in part on fairness at a layer other than the MAC layer. Specifically, the present inventors have invented a scheduling algorithm that is based on TCP throughput. Such an algorithm may still be considered proportionally fair, but it is proportionally fair based on the TCP throughput, not the MAC layer throughput, and on ensuring fairness at the TCP layer. The proportionally fair algorithm of the present invention based on TCP throughput is referred to hereinafter as the TCP Proportionally Fair (TCP-PF) Algorithm.

Referring once again to equation 1, which represents a scheduling metric in the prior proportionally fair algorithm used to schedule wireless transmissions, the term $A_i[n]$ represents the average throughput as received by user i up to and including timeslot n. However, this throughput is not the throughput at the TCP layer but is, instead, the throughput at the MAC layer. A scheduling metric $M_i^{(TCP-PF)}[n]$ used to schedule a user i according to the TCP-PF Algorithm, that takes into account throughput of the TCP layer rather than only the MAC layer, can be expressed as:

$$M_i^{(TCP-PF)}[n] = \frac{R_i[n]}{\Gamma_i[n-1]} \quad (3)$$

where n is the timeslot in which a user transmission is to be scheduled, $R_i[n]$ is a desired transmission rate such as, in the embodiment described herein, the maximum feasible transmission rate for user i in timeslot n measured, for example, in bits/second. One skilled in the art will recognize that any suitable transmission rate may be equally effective for use in scheduling operations. $\Gamma_i[n-1]$ in equation 3 is the smoothed average TCP throughput of user i as estimated at timeslot n based on scheduled transmissions up to and including timeslot n−1. An expression for TCP throughput ($\Gamma_i[n-1]$) is difficult to obtain as it depends on several variables, such as the dynamics of the congestion control mechanisms, the round trip time (RTT) and the interaction with lower layer protocols, such as IP, PPP and the other protocols discussed above. However, for relatively long periods of TCP data transmissions, TCP throughput is closely approximated as the ratio of a) the size of the congestion control transmission window (discussed previously), to b) the average RTT (i.e., the average system time of a packet). The system time of a packet is the time taken from when a packet is transmitted by a sender, such as sender 201 in FIG. 2, until that packet is received by a user, such as user 209 in FIG. 2. The congestion control transmission window can be taken as proportional to the MAC layer throughput $A_i$ of equation 2 since a larger MAC throughput translates into a larger number of packets sent and acknowledgements received by the sender which, in turn, results in a greater increase in the TCP congestion window. Thus, the TCP throughput can be expressed as:

$$\Gamma_i[n-1] = \frac{A_i[n-1]}{T_i[n]} \quad (4)$$

where $A_i[n-1]$ is the MAC layer throughput for user i through timeslot n−1 and $T_i[n]$ is the average system time of a packet of user i as estimated at time n. Accordingly, the scheduling metric of equation 3 can be rewritten as:

$$M_i^{(TCP-PF)}[n] = \frac{R_i[n]}{A_i[n-1]} T_i[n] \quad (5)$$

Therefore, the metric for a use in a TCP-PF Algorithm can be estimated if, for user i, the maximum feasible transmission rate $R_i[n]$, the MAC layer throughput $A_i[n-1]$ and the system time $T_i[n]$ of a packet for a user are known or closely estimated. While MAC layer throughput is readily available according to equation 2, the total average system time of a packet is difficult to estimate because the system time is the sum of several components including the waiting, scheduling and transmission time of the packet over the air interface, processing and buffering delays in the backhaul network and at the TCP sender, as well as transmission delays in the wired network. However, components of the system time related to the backhaul network can be assumed to be relatively small when compared to the queuing and scheduling times in the scheduling queue and, thus, these backhaul network components may be ignored. Since packets are broken into segments for transmission, the system time of a packet can thus be approximated as that time taken from when the first segment of a packet enters the system to when the last segment of the packet is transmitted to the end user. Therefore, the total average system time $T_p$ of a packet can be approximated as:

$$T_p = S + N_s(\overline{X} + \overline{V}) + (\overline{K} - 1)(\overline{X} + \overline{V}) + \overline{X} \quad (6)$$

where $N_s$ is the number of segments waiting in queue, S is the residual service time of the segment currently being served (i.e., the time required by the server to finish the service of the segment of the packet currrently being served), $\overline{X}$ is the average service time of packet segments, $\overline{V}$ is the average time taken by the server between the end of service to one segment and the beginning of service of the next successive segment, $\overline{K}$ is the average number of segments in a packet, and $N_s(\overline{X}+\overline{V})$ is the total average time required to transmit all the segments in the queue. The term $N_s(\overline{X}+\overline{V})$ can be expressed as $$N_s(\overline{X} + \overline{V}) = \frac{Q_i}{A_i},$$

where the average queue size $Q_i$ at the MAC layer is divided by the average MAC throughput $A_i$. The term $(\overline{K}-1)(\overline{X}+\overline{V})$ can be ignored if the average number of segments in the buffer is larger than the number of segments per TCP packet, as is typically the case. Additionally, the last term $\overline{X}$ can be ignored as being relatively small when compared to the other terms as long as there is a large number of users in the system as, once again, is typically the case.

Hence, the overall system time of a packet can be closely approximated by the total system time of a packet in the wireless portion of the network and can be expressed by:

$$T_p = S + \frac{Q_i}{A_i} \quad (7)$$

where $A_i$ is the average MAC throughput (as calculated in equation 2) and $Q_i$ is the average queue size for user i. When the number of users M in the system is reasonably large, the residual service time S in equation 7 can be estimated as:

$$S = \frac{1}{2}\rho \frac{\overline{V^2} + \frac{1}{M-1}\overline{V}^2}{\overline{V}} + \frac{1}{2}(1-\rho)\frac{\overline{V^2}}{\overline{V}} \simeq \frac{1}{2}\frac{\overline{V_i^2}}{\overline{V_i}} \quad (8)$$

where $\rho$ is a utilization factor calculated as $\rho = \lambda_p \overline{K}(\overline{X}+\overline{V})$ with $\lambda_p$ being the arrival rate of packets to the queue measured in packets per second and the other terms are as described previously. The term $\overline{V^2}$ is the average of the square of the inter-scheduling interval, hereinafter referred to as the second moment of the inter-scheduling interval.

Accordingly, the scheduling metric of equation 5, for the TCP-PF Algorithm can be rewritten as:

$$M_i^{(TCP-PF)}[n] = \frac{R_i[n]}{A_i[n-1]} \left[ \frac{1}{2}\frac{\overline{V_i^2}}{\overline{V_i}} + \frac{Q_i}{A_i} \right]. \quad (9)$$

When used for scheduling user transmissions during online operations, the average MAC throughput is estimated by $A_i[n-1]$ and the average MAC queue size $Q_i$ is estimated by the smoothed average queue size $Q_i[n]$ at timeslot n:

$$Q_i[n] = \omega q_i[n] + (1-\omega)Q_i[n-1]. \quad (10)$$

where $q_i[n]$ is the instantaneous queue size for user i at time slot n, $\omega$ is an exponential weighting factor similar to that described previously, and $Q_i[n-1]$ is the smoothed average queue size for user i calculated at timeslot n−1. Additionally, when used for online operations, the average inter-scheduling interval $\overline{V_i}$ in equation 9 can be written as:

$$\overline{V_i} = \hat{\Phi}_i[n] = \alpha \hat{\phi}_i[n] + (1-\alpha)\Phi_i^j \quad (11)$$

where $\alpha$ is a tunable parameter between 0 and 1 used to control the time scales over which the average inter-scheduling interval is estimated; $\hat{\phi}_i[n]$ is the elapsed time, as measured at timeslot n, since user i was last scheduled; and $\Phi_i^j$ is the smoothed average of past inter-scheduling intervals for user i at the j-th transmission.

The second moment $\overline{V_i^2}$ of the inter-scheduling interval used in equation 9 can be written as:

$$\overline{V_i^2} = \hat{\Sigma}_i[n] = \beta(\hat{\phi}_i[n])^2 + (1-\beta)\Sigma_i^j \quad (12)$$

where $\beta$, similar to the variable $\alpha$ in equation 11, is a tunable parameter between 0 and 1 used to control the time scales over which the second moment of the inter-scheduling interval is averaged and $\Sigma_i^j$ is the smoothed value of the second moment of past inter-scheduling intervals. In equations 11 and 12, $\alpha$ and $\beta$ can be tuned to give appropriate weight to the long term effects of the average inter-scheduling intervals balanced with the instantaneous changes of large inter-scheduling intervals. One goal of such tuning is to give priority to users whose packets have experienced long waiting times thus helping to avoid TCP timeouts. Preferably, α should be relatively large (e.g., α=0.9) as compared to β (e.g., β=0.5). One skilled in the art will recognize that other values for α and β may be selected to provide equally preferable results depending on system dynamics.

Also in equations 11 and 12, the smoothed historical values of the mean $\Phi_i^j$ and the second moment $\Sigma_i^j$ of the inter-scheduling intervals are updated after a scheduling decision is made and may be expressed, respectively, as:

$$\Phi_i^j = \alpha\phi_i^j + (1-\alpha)\Phi_i^{j-1} \quad (13)$$

and $$\Sigma_i^j = \beta(\phi_i^j)^2 + (1-\beta)\Sigma_i^{j-1} \quad (14)$$

where $\phi_i^j$ is the inter-scheduling interval for user i at transmission j (i.e., the time elapsed between transmission j−1 and transmission j of that particular user); and $\Phi_i^{j-1}$ and $\Sigma_i^{j-1}$ are the smoothed historical values at the j−1 transmission for user i of, respectively, the mean and the second moment of the inter-scheduling intervals.

Thus, the scheduling metric of equation 9 for the TCP-PF Algorithm can be rewritten as:

$$M_i^{(TCP-PF)}[n] = \frac{R_i[n]}{A_i[n-1]}\left[\frac{1}{2}\frac{\hat{\Sigma}_i[n]}{\hat{\Phi}_i[n]} + \frac{Q_i[n]}{A_i[n-1]}\right] \quad (15)$$

with the terms as described above. One skilled in the art will recognize that, although equation 15 is based in part on the TCP throughput $\Gamma_i$ of equation 3, all terms within equation 15 are known at the MAC layer or can be calculated based on information available at that layer. Accordingly, the scheduling metric of equation 15 allows for scheduling a transmission for a user in a TCP proportionally fair manner without requiring any information that is only available at the TCP layer. Thus, TCP throughput is improved and the aforementioned problems relating to scheduling delays and TCP timeouts are substantially eliminated.

Figure 5:
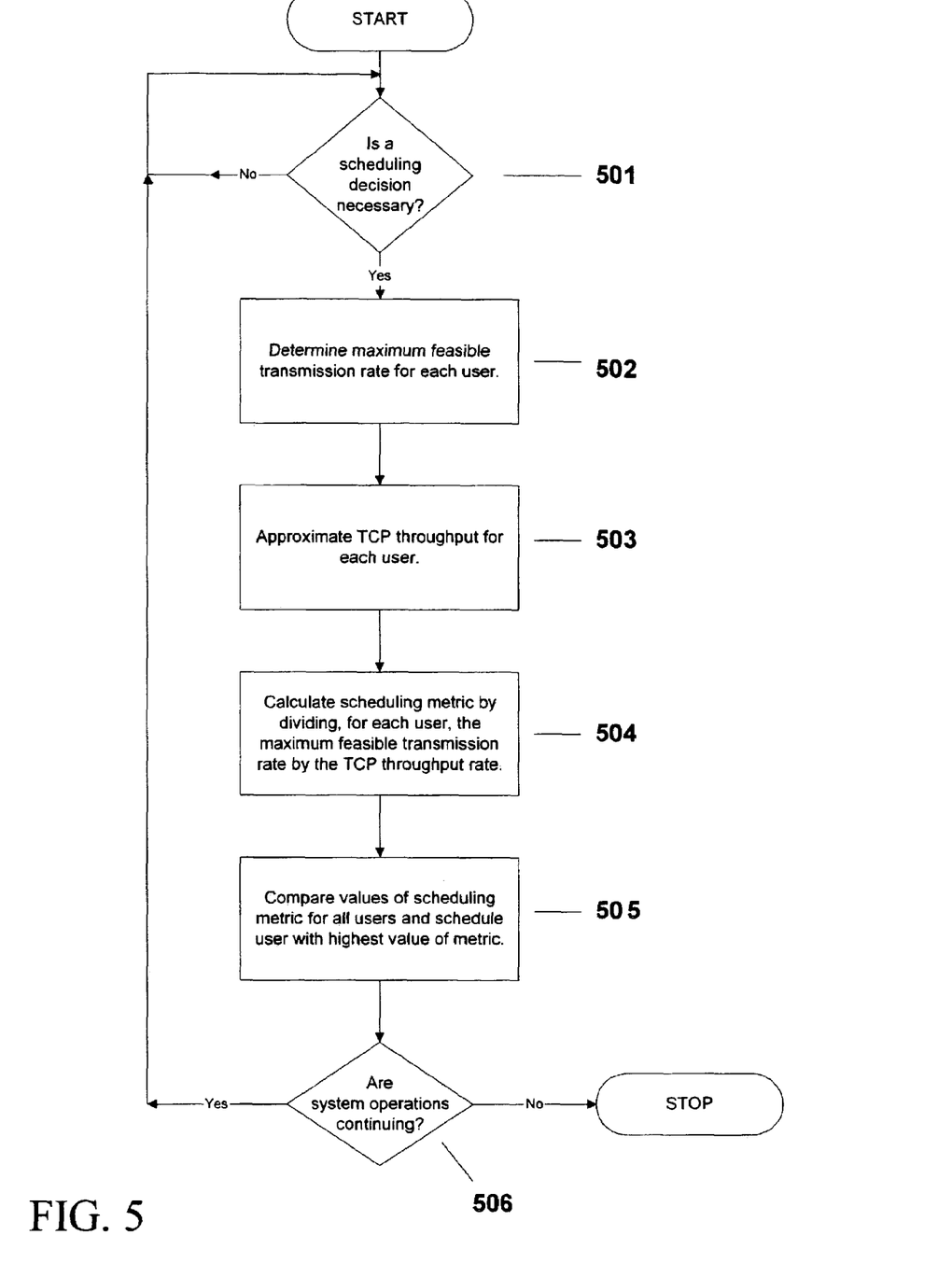
FIG. 5 shows a flow diagram of an illustrative scheduling process in accordance with the principles of the present invention.

FIG. 5 shows the steps of an illustrative method for scheduling transmissions to a plurality of mobile users in accordance with the principles of the present invention. One skilled in the art will recognize that, for example, the steps represented by the flow chart of FIG. 5 may illustratively be carried out by software executed on a processor. Such a processor may reside, illustratively, in the MSC, the BS or any other component of network 115 in FIG. 1. In FIG. 5, at step 501 a determination is made as to whether a scheduling decision is necessary. If not, the scheduling system waits until such a decision is needed. If yes, then at step 502 the maximum feasible transmission rate for user i is determined. Next, at step 503, the TCP throughput for each user i is approximated as described above in association with equations 4-15. One skilled in the art will recognize that obtaining a discrete value for the TCP throughput is not necessary in practice. Instead, as is illustrated in equation 15, the individual variables making up the approximated TCP throughput may be calculated and used directly in the scheduling metric. Next, at step 504, a scheduling metric for each user is calculated by dividing the maximum feasible transmission rate for each user (determined at step 502) by the TCP throughput for each user (approximated at step 503). At step 505, the calculated metrics for all users are compared and the user with the highest calculated metric is scheduled for transmission. Finally, at step 506, a determination is made as to whether system operations are continuing. If so, then the method returns to step 501 to determine whether a scheduling decision is necessary. If not, then the process ends until system operations begin again.

The foregoing merely illustrates the principles of the invention. It will thus be appreciated that those skilled in the art will be able to devise various arrangements which, although not explicitly described or shown herein, embody the principles of the invention and are within its spirit and scope. For example, although the embodiments described hereinabove refer to a wireless network, one skilled in the art will recognize that the principles in those embodiments could be equally applied to any other network, such as a wired network, that uses scheduling to prioritize transmissions to or from users. Furthermore, all examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. A method for scheduling data transmissions in a wireless communication system between a base station and a plurality of mobile terminals, said method comprising:
   calculating the value of a scheduling metric for each mobile terminal in said plurality of mobile terminals, wherein said scheduling metric is representative of a transmission control protocol (TCP) throughput for each of said mobile terminals, wherein said scheduling metric is a function of $R_i Q_i/A_i$ where $Q_i$ is the average size of a queue for a user i in a Medium Access Control (MAC) layer in said network, $A_i$ is an average MAC layer throughput for said user i in said network, and $R_i$ is a desired transmission rate for said user i in said network; and
   scheduling transmissions between said base station and said mobile terminals as a function of said calculated values of said scheduling metric.

2. The method of claim 1 wherein the step of scheduling comprises:
   comparing the calculated values of said scheduling metric for each mobile terminal; and
   scheduling that mobile terminal having the highest value of said scheduling metric.

3. The method of claim 1 wherein said scheduling metric is calculated for each mobile terminal using only information available at a Medium Access Control layer in said wireless communication network.

4. The method of claim 1 wherein said scheduling metric is a function of at least one of:
   the inter-scheduling delay in serving a queue in said network; and
   the second moment of said inter-scheduling delay.

5. The method of claim 4 wherein said scheduling metric is a function of at least one of:
   the size of a queue in said network;
   a desired transmission rate related to a user in said network; and
   a data throughput at a network protocol layer in said network.

6. The apparatus of claim 4 wherein said scheduling metric is defined as:

$$M_i^{(TCP-PF)}[n] = \frac{R_i[n]}{A_i[n-1]}\left[\frac{1}{2}\frac{\hat{\Sigma}_i[n]}{\hat{\Phi}_i[n]} + \frac{Q_i[n]}{A_i[n-1]}\right]$$

where $R_i[n]$ is a desired transmission rate in a network at a timeslot n for a user i, $A_i[n-1]$ is an average Medium Access Control (MAC) layer throughput for user i up to and including a timeslot n–i, $\hat{\Sigma}_i[n]$ is a second moment of an inter-scheduling interval for user i at timeslot n in said network, $\hat{\Phi}_i[n]$ is an average inter-scheduling interval for user i at timeslot n in said network, and $Q_i[n]$ is the average size of a queue for a user i in said MAC layer in said network.

7. The method of claim 1 wherein said scheduling metric is a function of the system time of a packet.

8. The method of claim 1 wherein said scheduling metric is a function of the size of a queue in said network multiplied by a desired transmission rate related to a user in said network divided by a data throughput at a network protocol layer in said network.

9. The method of claim 1 wherein said scheduling metric is a function of the size of a queue in said network multiplied by a desired transmission rate related to a user in said network divided by the square of a data throughput at a network protocol layer in said network.

10. The method of claim 1 wherein said scheduling metric is a function of $R_iQ_i/A_i^2$ where $Q_i$ is the average size of a queue for a user i in a Medium Access Control (MAC) layer in said network, $A_i$ is an average MAC layer throughput for said user i in said network, and $R_i$ is a desired transmission rate for said user i in said network.

11. The method of claim 1 wherein said scheduling metric is defined as:

$$M_i^{(TCP-PF)}[n] = \frac{R_i[n]}{A_i[n-1]}\left[\frac{1}{2}\frac{\hat{\Sigma}_i[n]}{\hat{\Phi}_i[n]} + \frac{Q_i[n]}{A_i[n-1]}\right]$$

where $R_i[n]$ is a desired transmission rate in a network at a timeslot n for a user i, $A_i[n-1]$ is an average Medium Access Control (MAC) layer throughput for user i up to and including a timeslot n–i, $\hat{\Sigma}_i[n]$ is a second moment of an inter-scheduling interval for user i at timeslot n in said network, $\hat{\Phi}_i[n]$ is an average inter-scheduling interval for user i at timeslot n in said network, and $Q_i[n]$ is the average size of a queue for a user i in said MAC layer in said network.

12. Apparatus for use in scheduling data transmissions in a wireless communication system between a base station and a plurality of mobile terminals, said apparatus comprising:
  a first circuit for calculating the value of a scheduling metric for each mobile terminal in said plurality of mobile terminals, wherein said scheduling metric is representative of a transmission control protocol (TCP) throughput for each of said mobile terminals, wherein said scheduling metric is a function of $R_iQ_i/A_i$ where $Q_i$ is the average size of a queue for a user i in a Medium Access Control (MAC) layer in said network, $A_i$ is an average MAC layer throughput for said user i in said network, and $R_i$ is a desired transmission rate for said user i in said network; and
  a second circuit for scheduling transmissions between said base station and said mobile terminals as a function of said calculated values of a scheduling metric.

13. The apparatus of claim 12 wherein said first circuit and said second circuit comprise the same circuit.

14. The apparatus of claim 12 further comprising:
  a third circuit for comparing the calculated values of said scheduling metric for each mobile terminal,
  wherein said second circuit schedules for transmission that mobile terminal having the highest value of said scheduling metric.

15. The apparatus of claim 14 wherein said first circuit, said second circuit and said third circuit comprise the same circuit.

16. The apparatus of claim 12 wherein said first circuit calculates said scheduling metric for each mobile terminal using only information available at a Medium Access Control layer in said wireless communication network.

17. The apparatus of claim 12 wherein said scheduling metric is a function of at least one of:
  the inter-scheduling delay in serving a queue in said network; and
  the second moment of said inter-scheduling delay.

18. The apparatus of claim 17 wherein said scheduling metric is a function of at least one of:
  the sire of a queue in said network;
  a desired transmission rate related to a user in said network; and
  a data throughput at a network protocol layer in said network.

19. The apparatus of claim 12 wherein said scheduling metric is a function of the system time of a packet.

20. The apparatus of claim 12 wherein said scheduling metric is a function of the size of a queue in said network multiplied by a desired transmission rate related to a user in said network divided by a data throughput at a network protocol layer in said network.

21. The apparatus of claim 12 wherein said scheduling metric is a function of the size of a queue in said network multiplied by a desired transmission rate related to a user in said network divided by the square of a data throughput at a network protocol layer in said network.

22. The apparatus of claim 12 wherein said scheduling metric is a function of $R_iQ_i/A_i^2$ where $Q_i$ is the average size of a queue for a user i in a Medium Access Control (MAC) layer in said network, $A_i$ is an average MAC layer throughput for said user i in said network, and $R_i$ is a desired transmission rate for said user i in said network.

23. A scheduler for use in scheduling future data transmissions from a base station to a plurality of mobile terminals in a wireless communications system, said scheduler comprising:
  means for calculating the value of a scheduling metric for each mobile terminal in said plurality of mobile terminals, wherein said scheduling metric is representative of a transmission control protocol (TCP) throughput for each of said mobile terminals, wherein said scheduling metric is a function $R_iQ_i/A_i^2$ where $Q_i$ is the average size of a queue for a user i in a Medium Access Control (MAC) layer in said network. $A_i$ is an average MAC layer throughput for said user i in said network, and $R_i$ is a desired transmission rate for said user i in said network; and
  means for scheduling transmissions between said base station and said mobile terminals as a function of said calculated values of a scheduling metric.

24. The apparatus of claim 23 wherein the means for scheduling comprises:
   means for comparing the calculated values of said scheduling metric for each mobile terminal; and
   means for scheduling that mobile terminal having the highest value of said scheduling metric.

25. The apparatus of claim 23 wherein said means for scheduling calculates said scheduling metric for each mobile terminal using only information available at a Medium Access Control layer in said wireless communication network.

26. The apparatus of claim 23 wherein said scheduling metric is a function of at least one of:
   the inter-scheduling delay in serving a queue in said network; and
   the second moment of said inter-scheduling delay.

27. The apparatus of claim 26 wherein said scheduling metric is a function of at least one of:
   the size of a queue in said network;
   a desired transmission rate related to a user in said network; and
   a data throughput at a network protocol layer in said network.

28. The apparatus of claim 23 wherein said scheduling metric is a function of the system time of a packet.

29. The apparatus of claim 23 wherein said scheduling metric is a function of the size of a queue in said network multiplied by a desired transmission rate related to a user in said network divided by a data throughput at a network protocol layer in said network.

30. The apparatus of claim 23 wherein said scheduling metric is a function of $R_i Q_i / A_i$ where $Q_i$ is the average size of a queue for a user i in a Medium Access Control (MAC) layer in said network, $A_i$ is an average MAC layer throughput for said user i in said network, and $R_i$ is a desired transmission rate for said user i in said network.

31. The apparatus of claim 23 wherein said scheduling metric is a function of the size of a queue in said network multiplied by a desired transmission rate related to a user in said network divided by the square of a data throughput at a network protocol layer in said network.

32. The apparatus of claim 23 wherein said scheduling metric is defined as:

$$M_i^{(TCP-PF)}[n] = \frac{R_i[n]}{A_i[n-1]} \left[ \frac{1}{2} \frac{\hat{\Sigma}_i[n]}{\hat{\Phi}_i[n]} + \frac{Q_i[n]}{A_i[n-1]} \right]$$

where $R_i[n]$ is a desired transmission rate in a network at a timeslot n for a user i, $A_i[n-1]$ is an average Medium Access Control (MAC) layer throughput for user i up to and including a timeslot n−i, $\hat{\Sigma}_i[n]$ is a second moment of an inter-scheduling interval for user i at timeslot n in said network, $\hat{\Phi}_i[n]$ is an average inter-scheduling interval for user i at timeslot n in said network, and $Q_i[n]$ is the average size of a queue for a user i in said MAC layer in said network.

* * * * *